(12) United States Patent
Gallucci et al.

(10) Patent No.: US 10,221,314 B2
(45) Date of Patent: Mar. 5, 2019

(54) MISCIBLE POLYPHENYLENE ETHER SULFONE/POLYALKYLENE TEREPHTHALATE BLENDS

(71) Applicant: SABIC GLOBAL TECHNOLOGIES B.V., Bergen op Zoom (NL)

(72) Inventors: Robert Russell Gallucci, Mt. Vernon, IN (US); Mark A. Sanner, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/556,534

(22) PCT Filed: Mar. 8, 2016

(86) PCT No.: PCT/US2016/021346
§ 371 (c)(1),
(2) Date: Sep. 7, 2017

(87) PCT Pub. No.: WO2016/144947
PCT Pub. Date: Sep. 15, 2016

(65) Prior Publication Data
US 2018/0044524 A1    Feb. 15, 2018

Related U.S. Application Data

(60) Provisional application No. 62/130,112, filed on Mar. 9, 2015.

(51) Int. Cl.
| | | |
|---|---|---|
| *C08L 81/06* | (2006.01) | |
| *C08G 65/38* | (2006.01) | |
| *C08G 75/23* | (2006.01) | |
| *C08L 67/02* | (2006.01) | |
| *C08L 67/00* | (2006.01) | |
| *C08L 81/00* | (2006.01) | |
| *C08L 81/02* | (2006.01) | |

(52) U.S. Cl.
CPC ............. *C08L 81/06* (2013.01); *C08G 65/38* (2013.01); *C08G 75/23* (2013.01); *C08L 67/00* (2013.01); *C08L 67/02* (2013.01); *C08L 81/00* (2013.01); *C08L 81/02* (2013.01); *C08L 2205/025* (2013.01); *C08L 2205/06* (2013.01)

(58) Field of Classification Search
None
See application file for complete search history.

(56) References Cited

U.S. PATENT DOCUMENTS

| | | | |
|---|---|---|---|
| 4,176,222 A | 11/1979 | Cinderey et al. | |
| 4,293,670 A | 10/1981 | Robeson et al. | |
| 4,473,684 A | 9/1984 | Maresca et al. | |
| 4,503,168 A | 3/1985 | Hartsing, Jr. | |
| 5,037,902 A | 8/1991 | Harris et al. | |
| 5,134,202 A | 7/1992 | Harris et al. | |
| 5,191,305 A | 3/1993 | Frost et al. | |
| 5,212,259 A | 5/1993 | Harris et al. | |
| 5,852,139 A * | 12/1998 | Scheckenbach | C08L 81/00 525/537 |
| 6,482,880 B1 | 11/2002 | Rock | |
| 8,034,857 B2 | 10/2011 | Kailasam et al. | |
| 9,074,093 B2 | 7/2015 | Gallucci et al. | |
| 2005/0113558 A1 | 5/2005 | Johnson et al. | |
| 2006/0069236 A1 | 3/2006 | Brunelle et al. | |
| 2006/0167216 A1 | 7/2006 | Johnson et al. | |
| 2007/0066738 A1 | 3/2007 | Gallucci et al. | |
| 2008/0119618 A1 | 5/2008 | Agarwal et al. | |

FOREIGN PATENT DOCUMENTS

JP    2009209351 A    9/2009

OTHER PUBLICATIONS

International Search Report for International Application No. PCT/US16/21346, International Filing Date Mar. 8, 2016, dated May 13, 2016, 5 pages.
Written Opinion for International Application No. PCT/US16/21346, International Filing Date Mar. 8, 2016, dated May 13, 2016, 5 pages.

* cited by examiner

*Primary Examiner* — Christopher M Rodd
(74) *Attorney, Agent, or Firm* — Cantor Colburn LLP

(57) ABSTRACT

Described herein is a composition comprising a polymer blend. The polymer blend comprises 92 to 99 weight percent of a polyphenylene ether sulfone and 1 to 8 weight percent of a polyalkylene terephthalate, wherein weight percent is based on the combined weight of the polyphenylene ether sulfone and polyalkylene terephthalate. The polymer blend has a transmittance greater than or equal to 60% and a haze less than or equal to 10% at a thickness of 3.2 millimeters, as determined according to ASTM D1003.

14 Claims, No Drawings

MISCIBLE POLYPHENYLENE ETHER SULFONE/POLYALKYLENE TEREPHTHALATE BLENDS

CROSS REFERENCE TO RELATED APPLICATIONS

This application is a National Stage application of PCT/US16/21346, filed Mar. 8, 2016, which claims the benefit of U.S. Provisional Application No. 62/130,112, filed Mar. 9, 2015, both of which are incorporated by reference in their entirety herein.

BACKGROUND

Polyphenylene ether sulfone resins have exceptionally multi axial strength without rubber modification. However, in many applications such as electronics, medical applications and food service applications their high viscosity make them difficult to mold into large thin walled parts due to their high melt viscosity. Accordingly, there remains a need in the art for a polyphenylene ether sulfone based material that has lower melt viscosity but which retains many or all of the advantages of polyphenylene ether sulfone.

BRIEF DESCRIPTION

Described herein is a composition comprising a polymer blend of 92 to 99 weight percent of a polyphenylene ether sulfone and 1 to 8 weight percent of a polyalkylene terephthalate, wherein weight percent is based on the combined weight of the polyphenylene ether sulfone and polyalkylene terephthalate. The polyphenylene ether sulfone comprises greater than or equal to 70 mole % of repeating units of formula (1)

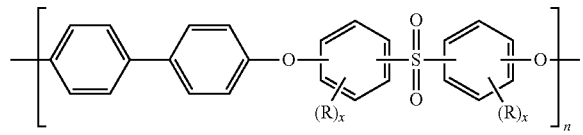

wherein each R is independently a $C_{1-8}$ alkyl, $C_{6-12}$ C aryl, $C_{7-11}$ alkylarylene, $C_{1-8}$ alkoxy, halogen or a combination comprising at least one of the foregoing, n equals 25 to 1000, x is 0 to 4, and the aryl sulfone linkages are 4,4' linkages, 3,3' linkages, 3,4' linkages or a combination comprising at least one of the foregoing. The polyalkylene terephthalate is derived from a $C_2$ to $C_8$ aliphatic or cycloaliphatic diol or a combination of aliphatic or cycloaliphatic $C_2$ to $C_8$ diols. The polymer blend has a light transmittance greater than or equal to 60% and a haze less than or equal to 10% at a thickness of 3.2 millimeters, as determined according to ASTM D1003-03. The above described and other features are exemplified by the following figures and detailed description.

DETAILED DESCRIPTION

The blend of 92 to 99 weight percent of a polyphenylene ether sulfone comprising greater than or equal to 70 mole % of repeating units of formula 1 and 1 to 8 weight percent of a polyalkylene terephthalate show a surprising combination of transparency, multi axial strength, ductility and a surprisingly high melt volume rate. With small changes in the amount of polyalkylene terephthalate the transparency is lost and the multi axial strength is greatly diminished. With a small change in the structure of the repeating units of the polyphenylene ether sulfone the transparency is lost.

The polymer blend has a percent light transmittance (% T) greater than or equal to 60% and a haze less than or equal to 10% at a thickness of 3.2 millimeters, as determined according to ASTM D1003-03. The % T can be less than or equal to 100%. Within this range the % T can be greater than or equal to 63%, or, greater than or equal to 65%. The haze can be less than or equal to 8%, or, less than or equal to 6%.

The polymer blend has multi axial total energy greater than or equal to 60 Joules as determined according to ASTM D3763-10 at 23° C. The multi axial total energy can be less than or equal to 100 Joules. Within this range the polymer blend can have a multi axial total energy greater than or equal to 65 Joules.

The polymer blend has a melt volume rate at 18 minutes that is within 20% of the melt volume rate at 6 minutes when determined according to ASTM D1238-10 at 337° C. and 6.7 kilograms. The polymer blend may have a melt volume rate at 18 minutes that is within 15% of the melt volume rate at 6 minutes.

The polymer blend has a melt volume rate greater than or equal to 2.5 cubic centimeters per 10 minutes ($cm^3/10$ min) at 6 minutes when determined according to ASTM D1238-10 at 300° C. and 6.7 kilograms. The melt volume rate can be less than or equal to 50 $cm^3/10$ min, or less than or equal to 20 $cm^3/10$ min. Within this range the melt volume rate can be greater than or equal to 3 $cm^3/10$ min, or, greater than or equal to 4 $cm^3/10$ min.

The polymer blend is a miscible polymer blend and has a single glass transition temperature and no melting temperature as determined by differential scanning calorimetry.

Polyphenylene ether sulfones comprise greater than 70 mol % of repeating units having both an ether linkage and an aryl sulfone linkage in the backbone of the polymer as shown in formula (1)

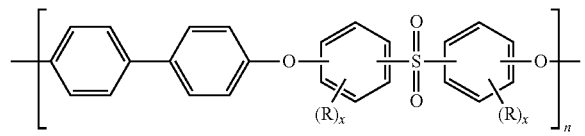

wherein each R is independently $C_{1-8}$ alkyl, $C_{6-12}$ aryl, $C_{7-11}$ alkylarylene, $C_{1-8}$ alkoxy, halogen or a combination comprising at least one of the foregoing, each x equals 0 to 4, more specifically 0, and n equals 25 to 1000, or, more specifically, n equals 25 to 500, or, more specifically, n equals 25 to 100. The aryl sulfone linkages can be 4,4',3,3',3,4' or a combination comprising at least one of the foregoing. In some embodiments the aryl sulfone linkages are 4,4' diaryl sulfone. The polyphenylene ether sulfone can comprise greater than 90 mole % of repeating units of formula (1).

An exemplary biphenol polyphenylene ether sulfone (PPSU) is shown in formula (2)

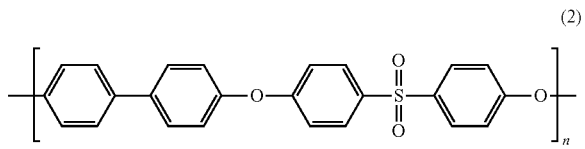

(2)

wherein n is as defined above. An exemplary biphenol polyphenylene ether sulfone comprises greater than 90 mole percent of repeating units of formula (2).

In some embodiments, the polyphenylene ether sulfone is a polyphenylene ether sulfone copolymer of formula (3)

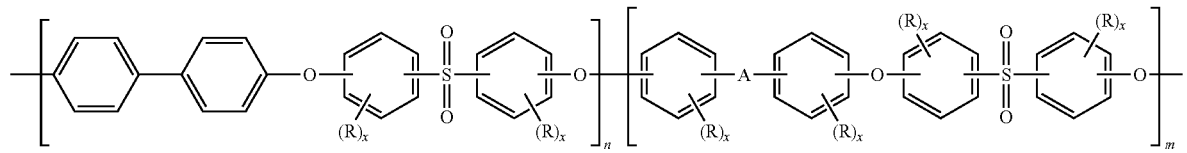

(3)

wherein A is a linking group selected from, —O—, —S—, —SO$_2$—, C$_6$-C$_{18}$ aryl, or C$_3$-C$_{12}$ alkyl. In some embodiments A is isopropylidene. Linkages of A to the aryl groups can be at the 4,4',3,3',3,4' positions or a combination comprising at least one of the foregoing. In many embodiments the linkages are at the 4,4' positions. Aryl sulfone linkages can be at the 4,4',3,3',3,4' positions or a combination comprising at least one of the foregoing. When m=0, the polyphenylene ether sulfone is a homopolymer.

Exemplary aromatic dihydroxy compounds that can be used to make the polyphenylene ether sulfone copolymers include bisphenols and biphenols such as bisphenol A, dimethyl cyclohexyl bisphenol, dihydroxy diphenyl ether, hydroquinone, methyl hydroquinone and 4,4'-biphenol. Other exemplary aromatic dihydroxy compounds are disclosed in United States Patent Publication Nos. 2006/0167216, 2005/0113558, and 2006/0069236. However the polyphenylene ether sulfone copolymers should be predominantly (>70 mol %) based on biphenol as too high a concentration of other bisphenols, for example bisphenol A, can reduce miscibility with the polyalkylene terephthalate giving a loss of clarity and an increase in haze.

The polyphenylene ether sulfone can be a homopolymer, copolymer, or a combination thereof, or a combination of different polyphenylene ether sulfones. Copolymers include random copolymers, non-random copolymers and block copolymers.

An example of a polyphenylene ether sulfone copolymer is shown below in formula (4)

Polyphenylene ether sulfones are commercially available, including the polycondensation product of biphenol with dichloro diphenyl sulfone. Methods for the preparation of polyphenylene ether sulfones are widely known and several suitable processes have been well described in the art. Two methods, the carbonate method and the alkali metal hydroxide method, are known to the skilled artisan. In the alkali metal hydroxide method, a double alkali metal salt of a dihydric phenol is contacted with a dihalobenzenoid compound in the presence of a dipolar, aprotic solvent under substantially anhydrous conditions. The carbonate method, in which a dihydric phenol and a dihalobenzenoid compound are heated, for example, with sodium carbonate or bicarbonate and a second alkali metal carbonate or bicarbonate is also disclosed in the art, for example in U.S. Pat. No. 4,176,222. Alternatively, the polyphenylene ether sulfone can be prepared by any of the variety of methods known in the art including those described in the United States Patent Publications referenced above.

The molecular weight of the polyphenylene ether sulfone, as indicated by reduced viscosity data in an appropriate solvent such as methylene chloride, chloroform, N-methylpyrrolidone, or the like, can be greater than or equal to 0.3 dl/g, or, more specifically, greater than or equal to 0.4 dl/g and, typically, will not exceed 1.5 dl/g.

The polyphenylene ether sulfone has weight average molecular weight (Mw) of 10,000 to 90,000 Daltons as determined by gel permeation chromatography using ASTM D5296-05 with polystyrene standards. In some embodiments the polyphenylene ether sulfone weight average molecular weight can be 15,000 to 70,000 Daltons. Polyphenylene ether sulfones can have glass transition temperatures (Tg) of 180 to 250° C.

The polyphenylene ether sulfone has less than 50 ppm phenolic hydroxyl groups, and the polyphenylene ether sulfone is predominantly methyl ether end-capped. The polyphenylene ether sulfone can have less than 20 ppm phenolic hydroxyl end groups. Lower phenolic hydroxy end group content often results in better thermal stability of the polyphenylene ether sulfone polymer.

The polyphenylene ether sulfone is present in an amount of 92 to 99 weight percent, based on the combined weight

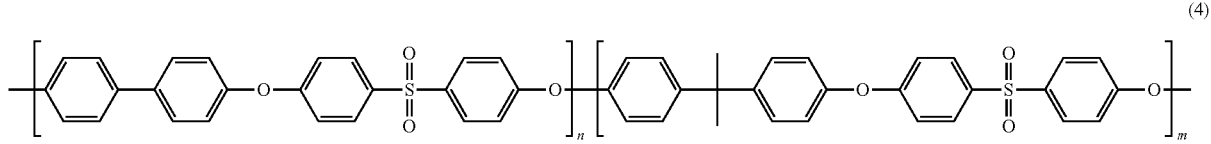

(4)

wherein n is greater than or equal to 70% and m is less than or equal to 30% based on the total of n+m and n+m=25 to 100.

of polyphenylene ether sulfone and polyalkylene terephthalate. Within this range the polyphenylene ether sulfone can be present in an amount greater than or equal to 95 weight percent. Also within this range the polyphenylene ether sulfone can be present in an amount less than or equal to 97 weight percent.

The polyalkylene terephthalates are derived from a $C_2$ to $C_8$ diol and terephthalic acid or a combination of $C_2$ to $C_8$ diols and terephthalic acid, and comprise repeating units of the following general formula:

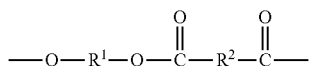

wherein and $R^1$ is a $C_2$ to $C_8$ aliphatic or cycloaliphatic group and $R^2$ is derived from terephthalic or isophthalic acid.

The diol may be ethylene glycol, propylene glycol, trimethylene glycol, 2-methyl-1,3-propane glycol, hexamethylene glycol, cyclohexane dimethanol, 1,4-butanediol, or a combination comprising at least one of the foregoing.

It is contemplated that the polyalkylene terephthalate may contain a minor amount of another dicarboxylic acid such as isophthalic acid, naphthalene dicarboxylic acid, adipic acid, palmitic acid, succinic acid, or a combination comprising at least one of the foregoing. In some instances the terephthalate content will be greater than 95 mol %. In other instance the terephthalate content will be above 97 mol %, and yet other instances the terephthalate content will be 100 mol %.

Exemplary polyalkylene terephthalates include poly(ethylene terephthalate) ("PET"), poly(1,4-butylene terephthalate), ("PBT"), poly(propylene terephthalate) ("PPT") poly (cyclohexane dimethyl terephthalate) ("PCT"), poly (cyclohexane dimethanol-ethylene glycol terephthalate) copolymers ("PETG and PCTG") and combinations comprising at least one of the foregoing.

The polyalkylene terephthalate can be a polyethylene terephthalate having a diethylene glycol (DEG) content of 0.1 to 4 weight percent based on the weight of the polyethylene terephthalate, an intrinsic viscosity greater than 0.4 and less than 0.90 dl/g and 5 to 100 meq/kg of carboxylic acid end groups.

The polyalkylene terephthalate can have an intrinsic viscosity of 0.4 to 0.9 dl/g. Within this range the intrinsic viscosity can be greater than or equal to 0.5 dl/g, or, greater than or equal to 0.6 dl/g. Also within this range the intrinsic viscosity can be less than or equal to 0.8 dl/g or less than or equal to 0.7 dl/g. Intrinsic viscosity can be determined by dissolving the polyalkylene terephthalate in a 60:40 phenol: tetrachloroethane solution in accordance with ASTM D4603-03.

The polyalkylene terephthalate comprises carboxylic acid end groups in an amount of 5 to 100 milliequivalents/kilogram (meq/kg), as determined by acid base titration per ASTM D7409-07. Within this range the amount of carboxylic end groups can be greater than or equal to 10 meq/kg, or, greater than or equal to 20 meq/kg. Also within this range the carboxylic end groups can be less than or equal to 50 meq/kg, or, less than or equal to 30 meq/kg. The polyalkylene terephthalate can be branched or linear and can have a weight average molecular weight (Mw) from 10,000 to 90,000 Daltons as determined by gel permeation chromatography as per ASTM D5296-05 using polystyrene standards.

The polyalkylene terephthalate has 0 to 300 ppm of cobalt and 10 to 300 pbw of antimony, titanium or a combination comprising at least one of the foregoing based on the weight of the polyalkylene terephthalate, and no detectable lead, cadmium or mercury.

The polyalkylene terephthalate is present in an amount of 1 to 8 weight percent, based on the combined weight of the polyphenylene ether sulfone and polyalkylene terephthalate. Within this range the polyalkylene terephthalate can be present in an amount greater than or equal to 3 weight percent based on the combined weight of the polyphenylene ether sulfone and polyalkylene terephthalate. Also within this range the polyalkylene terephthalate can be present in an amount less than or equal to 5 weight percent based on the combined weight of the polyphenylene ether sulfone and polyalkylene terephthalate.

The composition may optionally comprise a mold release agent, an ultraviolet light (UV) absorber, a heat stabilizer, a light stabilizer, a lubricant, a plasticizer, a pigment, a dye, a colorant, an anti-static agent, or a combination comprising at least one of the foregoing. An exemplary colorant is titanium dioxide. In some instances the titanium dioxide will be encapsulated with a shell comprising silica and/or alumina and have a particle size of from 1 to 10 micrometers. These additives are usually present in an amount of 0.01 to 5 weight percent, based on the total weight of the composition. When the composition comprises a pigment, dye or colorant the composition may have a light transmittance that is less than 60% as determined according to ASTM D1003-03 at a thickness of 3.2 millimeters. The composition may optionally comprise a filler which may be present in an amount up to 50 weight percent, based on the total weight of the composition. In some instances the filler will comprise 5 to 40 wt. % fiber glass having a diameter of from 6 to 20 microns.

The composition is made by melt mixing the components. Melt mixing can be achieved in an extruder, mixing bowl or similar mixing device which is capable of applying sufficient shear to the components. In some instances melt mixing will be achieved using an intermeshing co-rotating twin screw extruder operating at 150 to 600 rpm. It may be advantageous to apply vacuum during melt mixing. The components may be dried and/or dry blended prior to melt mixing. Melt mixing can be done at 300 to 360° C. to avoid degradation of the polymers. The composition can be melt filtered to remove black specks or contaminants, in some instances using a 20 to 80 micron melt filter. After melt mixing the composition can be pelletized and the pellets can then be molded.

In some instances the compositions described herein will be injection molded into articles such as: handles, trays, components of hand held electrical devices such as cell phones, computers and tablets; as well as medical devices such as lasers, endoscopes, staplers and rib spreaders, and devices used in food preparation and service such as scoops, dishes cups, spatulas and spoons.

The following examples illustrate the invention. They are set forth as a further description but are not to be construed as limiting the invention thereto.

EXAMPLES

Numbers designate examples of the invention, comparative examples are shown by letters. The examples use the materials shown in Table 1.

TABLE 1

| MATERIAL | DESCRIPTION | SUPPLIER |
|---|---|---|
| PPSU | A polyphenylene ether sulfone derived from dichlorodiphenyl sulfone and biphenol; CAS# 25608-64-4 | Available as RADEL R5100 from Solvay Co. |

TABLE 1-continued

| MATERIAL | DESCRIPTION | SUPPLIER |
|---|---|---|
| PET | Polyethylene terephthalate, intrinsic viscosity = 0.56 dl/g, CAS # 25038-59-9 | Available as 5F0441RP from Akra Polyesters S.A. de C.V. |
| PCT | Polycyclohexane dimethanol terephthalate, CAS # 25135-70-0 | Available from DuPont Co. |
| PETG | Polycyclohexane dimethanol-ethylene glycol terephthalate copolymer, CAS # 25640-14-6 | Available from Eastman Co. |
| PSu | the polymer from dichloro diphenyl sulfone and bisphenol A, Tg = 191° C., CAS # 25154-01-2 | Available as UDEL from Solvay Co |

Example 1 and Comparative Examples

A sample of PPSU, Radel 5100 NT from Solvay Co. was melt processed on a twin screw extruder with various alkyl phthalate polyesters (PET, PCT). The materials used in the experiments are shown in Table 1. Blends, shown in the various table below, were shaken on a paint shaker for approximately 5 minutes prior to extrusion. Extrusion was done in a vacuum vented 2 lobe 30 millimeter (mm) extruder with a mixing screw, at a barrel set temperature between 270 and 320° C. and 300 rpm screw speed. Resin blends were not pre-dried. The extrudate was cooled through a water bath prior to pelletizing. Resin pellets were dried at 125° C. for at least 3 hours and injection molded.

Table 2 shows a PPSU blend with 5, 10, and 20% wt of PET (weight percent is based on the combined weight of the PPSU and PET). At 5% PET the blend of example 1 is surprisingly miscible with a % T of 66.5 and a 2.5% haze and a Tg of 213° C. (Tg measured as per ASTM D3418-03 at a 20° C./min heating rate.)

The composition of example 1 has improved flow, lower MVR at 300° C. using a 6.7 Kg weight (3.0 vs. 1.3 cc/10 min), than the PPSU control example A. Example 1 also has a multiaxial impact strength (MAI) over 60 J and has ductile failure.

At higher levels of PET, 10 and 20% (Examples B & C), the PPSU blends are opaque with lower % T (8.0 and 3.0%) and higher (99) % $H_4$. Examples B and C also show lower MAI with brittle failure.

In addition, comparison of the 6 and 18 min MVR values show that examples B and C are not melt stable. The 18 min MVR values are much higher than the 6 min values. Note that Example 1 shows no change in 6 & 18 min. MVR at 300° C.

TABLE 2

| | Example | | | |
|---|---|---|---|---|
| | A | 1 | B | C |
| | 100 | 95:5 | 90:10 | 80:20 |
| | PPSU | PPSU:PET | PPSU:PET | PPSU:PET |
| part appearance | clear | clear | Opaque | opaque |
| Tg DSC C. | 224.2 | 213.0 | 213.9 | 217.3 |
| Tm DSC | no Tm | no Tm | PET Tm 265 | PET Tm 265 |
| MVR 6 min 300° C. 6.7 kg | 1.3 | 3.0 | 3.7 | 7.1 |
| MVR 18 min 300° C. | 1.3 | 3.0 | 4.0 | 11.7 |
| MAI total energy J | 77.1 | 67.1 | 47.6 | 5.1 |
| % ductile MAI | 100% | 100% | 50% | 0% |
| YI 3.2 mm | 62.1 | 50.2 | 134 | 156 |
| % T | 55.5 | 66.5 | 8.0 | 3.0 |
| % H | 6.6 | 2.5 | 99 | 99 |
| T Mod MPa | 2590 | 2520 | 2640 | 2580 |
| T. Str (Y) | 79.1 | 83.2 | 74.4 | 58.2 |
| % elong (B) | 18 | 16 | 8 | 3 |

Table 3 shows blends of PPSU with 3 and 5 weight percent PET as well as blends with 5 weight percent of PCT or PETG (weight percent is based on the total weight of the polymer blend). All of the polyester blends show high % T and low haze. The glass transition temperatures are reduced compared to the PPSU control A but are still above 200° C. The polyphenylene ether sulfone copolymers MVR values at 337° C. (6.7 Kg) are increased from 7.8 for PPSU to 9.7 to 12.0 $cm^3$/10 min. with 3 to 5 weight percent of the polyalkylene terephthalates.

Comparison of the 6 and 18 min. MVR for examples 2 to 5 show only a small increase which indicates good melt stability at this high (337° C.) processing temperature.

Control example D shows a blend of 5% PET with the BPA based polysulfone (PSu) resin (UDEL P1700). This blend is opaque showing none of the surprising transparency of the PPSU polyester blends. Only a small structural change in the polysulfone repeat units, going from biphenol based PPSU to the bis phenol A based PSu completely changes the clarity of the blend. Note that clarity of Examples 2 through 5 is retained even after the parts are heated at 160 or 180° C. showing that the polyester is not crystallizing to any extent to form large light scattering spherulites.

TABLE 3

| | PPSU-Polyester | | | | | |
|---|---|---|---|---|---|---|
| | | Example | | | | |
| | A | 2 | 3 | 4 | 5 | D |
| | | 97:3 | 95:5 | 95:5 | 95:5 | 95:5 |
| | PPSU | PPSU:PET | PPSU:PET | PPSU:PET | PPSU:PCTG | PSu:PET |
| part appearance as molded | clear | clear | clear | clear | clear | opaque |
| appearance 160° C. 24 h | clear | clear | clear | clear | clear | opaque |
| appearance 180° C. 22 h | clear | clear | clear | clear | clear | opaque |
| Tg DSC ° C. | 223.5 | 213.6 | 213.1 | 207.1 | 204.1 | 212.8 |
| MVR 337° C. 6 min | 7.8 | 9.7 | 9.9 | 11.9 | 12.0 | 27.3 |
| MVR 337° C. 18 min | 7.8 | 9.6 | 10.6 | 13.0 | 12.9 | 27.4 |

Table 4 shows the viscosity vs. shear rate for the PPSU blends (Examples 2-5) at 330° C. vs the PPSU control A. Note the improved flow (reduced viscosity) achieved with the PPSU blends with 3 and 5 wt % PET (Examples 2 and 3) as well as with the 5 wt % of the cyclohexane dimethanol based PCT and PETG polyesters (Examples 4 and 5) compared to the PPSU control example A. Viscosity, measured in Pascal seconds (Pa-s), is significantly reduced at all shear rates from 99 to 7018 reciprocal seconds.

Viscosity vs. shear rate was run as per ASTM test D3835-08 at 330° C.

TABLE 4

Viscosity vs. Shear PPSU Polyester Blends

| | | Shear Viscosity (Pa-s) 330° C. | | | |
|---|---|---|---|---|---|
| Shear Rate | PPSU | 97:3 PPSU:PET | 95:5 PPSU:PET | 95:5 PPSU:PCT | 95:5 PPSU:PETG |
| | | | Example | | |
| (1/s) | A | 2 | 3 | 4 | 5 |
| 99 | 5540 | 3528 | 3027 | 4092 | 2862 |
| 202 | 5098 | 2696 | 2306 | 2931 | 2225 |
| 296 | 4373 | 2273 | 1977 | 2384 | 1853 |
| 502 | 3292 | 1689 | 1500 | 1747 | 1416 |
| 643 | 2651 | 1445 | 1304 | 1489 | 1225 |
| 1003 | 1998 | 1088 | 999 | 1121 | 937 |
| 1502 | 1715 | 846 | 776 | 897 | 724 |
| 3008 | 1325 | 569 | 514 | 591 | 486 |
| 5011 | 996 | 402 | 353 | 390 | 331 |
| 7018 | 623 | 314 | 282 | 319 | 263 |

The compositions and methods are further illustrated by the following embodiments, which are non-limiting.

Embodiment 1

A composition comprising a polymer blend comprising 92 to 99 weight percent of a polyphenylene ether sulfone comprising greater than or equal to 70 mole % of repeating units of formula

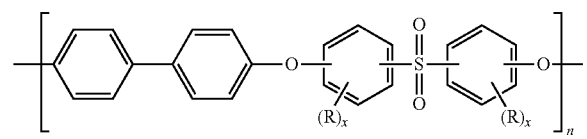

(1)

wherein each R is independently a $C_{1-8}$ alkyl, $C_{6-12}$ aryl, $C_{7-11}$ alkylarylene, $C_{1-8}$ alkoxy, halogen or a combination comprising at least one of the foregoing, and x is 0 to 4, n equals 25 to 1000, and the aryl sulfone linkages are 4,4' linkages, 3,3' linkages, 3,4' linkages or a combination comprising at least one of the foregoing; and 1 to 8 weight percent of a polyalkylene terephthalate, wherein the polyalkylene terephthalate is derived from a $C_2$ to $C_8$ aliphatic or cycloaliphatic diol or a combination of aliphatic or cycloaliphatic $C_2$ to $C_8$ diols, weight percent is based on the combined weight of the polyphenylene ether sulfone and polyalkylene terephthalate, and the polymer blend has a transmittance greater than or equal to 60% and a haze less than or equal to 10% at a thickness of 3.2 millimeters, as determined according to ASTM D1003-03.

Embodiment 2

The composition of Embodiment 1, wherein the polyphenylene ether sulfone comprises greater than or equal to 90 mol % of repeating units of formula (1).

Embodiment 3

The composition of Embodiment 1 or 2, wherein the polyalkylene terephthalate comprises a polyethylene terephthalate, a polycyclohexane dimethanol terephthalate, a polycyclohexane dimethanol-ethylene glycol terephthalate copolymer or a combination comprising at least one of the foregoing.

Embodiment 4

The composition of Embodiment 1 or 2, wherein the polyalkylene terephthalate is a polyethylene terephthalate having a diethylene glycol content of 0.1 to 4 weight percent based on the weight of the polyethylene terephthalate, an intrinsic viscosity greater than 0.4 and less than 0.90 dl/g and 5 to 100 meq/kg of carboxylic acid end groups.

Embodiment 5

The composition of any of Embodiments 1 to 4, wherein the polyphenylene ether sulfone has a weight average molecular weight of 10,000 to 90,000.

Embodiment 6

The composition of any one of the preceding Embodiments wherein the polyphenylene ether sulfone is present in an amount of 95 to 99 weight percent and the polyalkylene terephthalate is present in an amount of 1 to 5 weight percent.

Embodiment 7

The composition of any one of the preceding Embodiments wherein the polyphenylene ether sulfone is present in an amount of 95 to 97 weight percent and the polyalkylene terephthalate is present in an amount of 3 to 5 weight percent.

Embodiment 8

The composition of any one of the preceding Embodiments wherein the polymer blend has a single glass transition temperature and no melting temperature as determined by differential scanning calorimetry.

Embodiment 9

The composition of any one of the preceding Embodiments wherein the polymer blend has a melt volume rate greater than or equal to 2.5 at 6 minutes when determined according to ASTM D1238-10 at 300° C. and 6.7 kilograms.

Embodiment 10

The composition of any one of the preceding Embodiments wherein the polymer blend has a melt volume rate at 18 minutes is within 20% of the melt volume rate at 6 minutes when determined according to ASTM D1238-10 at 337° C. and 6.7 kilograms.

Embodiment 11

The composition of any one of the preceding Embodiments wherein the composition has a multi axial total energy greater than or equal to 60 Joules as determined according to ASTM D3763-10.

Embodiment 12

The composition of any one of the preceding Embodiments wherein the polyalkylene terephthalate has 0 to 300 ppm of cobalt and 10 to 300 pbw of antimony, titanium or a combination comprising at least one of the foregoing, based on the weight of the polyalkylene terephthalate, and no detectable lead, cadmium or mercury.

Embodiment 13

The composition of any one of the preceding Embodiments, wherein the polyphenylene ether sulfone has a phenolic hydroxyl end group concentration less than 20 ppm.

Embodiment 14

The composition of any one of the preceding Embodiments, wherein the composition further comprises titanium dioxide and the composition has a light transmittance less than 60% as determined according to ASTM D1003-03.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials or species, steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P.

Any of the groups named herein can be unsubstituted or substituted, with substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkylsulfonyl (—S(═O)$_2$-alkyl), a C$_{6-12}$ arylsulfonyl (—S(═O)$_2$-aryl), a thiol (—SH), a thiocyano (—SCN), a tosyl (CH$_3$C$_6$H$_4$SO$_2$—), a C$_{6-12}$ aryl, a C$_{7-13}$ arylalkylene, a C$_{4-12}$ heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A composition comprising:
   a polymer blend comprising
      92 to 99 weight percent of a polyphenylene ether sulfone comprising greater than or equal to 70 mole % of repeating units of formula

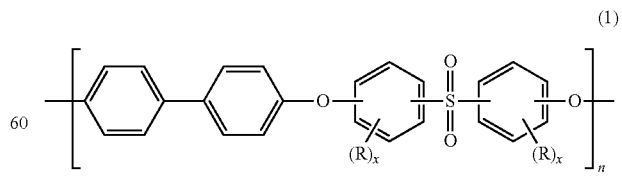

(1)

wherein each R is independently a C$_{1-8}$ alkyl, C$_{6-12}$ aryl, C$_{7-11}$ alkylarylene, C$_{1-8}$ alkoxy, halogen, or a combination comprising at least one of the foregoing, and x is 0 to 4, n equals 25 to 1000, and the aryl sulfone linkages are 4,4' linkages, 3,3' linkages, 3,4' linkages or a combination comprising at least one of the foregoing; and 1 to 8 weight percent of a polyalkylene terephthalate, wherein the polyalkylene terephthalate is derived from a $C_2$ to $C_8$ aliphatic or cycloaliphatic diol or a combination of aliphatic or cycloaliphatic $C_2$ to $C_8$ diols, weight percent is based on the combined weight of the polyphenylene ether sulfone and polyalkylene terephthalate;

wherein the polymer blend has a transmittance greater than or equal to 60% and a haze less than or equal to 10% at a thickness of 3.2 millimeters, as determined according to ASTM D1003-03.

2. The composition of claim 1, wherein the polyphenylene ether sulfone comprises greater than or equal to 90 mol % of repeating units of formula (1).

3. The composition of claim 1, wherein the polyalkylene terephthalate comprises a polyethylene terephthalate, a polycyclohexane dimethanol terephthalate, a polycyclohexane dimethanol-ethylene glycol terephthalate copolymer or a combination comprising at least one of the foregoing.

4. The composition of claim 1, wherein the polyalkylene terephthalate is a polyethylene terephthalate having a diethylene glycol content of 0.1 to 4 weight percent based on the weight of the polyethylene terephthalate, an intrinsic viscosity greater than 0.4 and less than 0.90 dl/g and 5 to 100 meq/kg of carboxylic acid end groups.

5. The composition of claim 1, wherein the polyphenylene ether sulfone has a weight average molecular weight of 10,000 to 90,000.

6. The composition of claim 1, wherein the polyphenylene ether sulfone is present in an amount of 95 to 99 weight percent and the polyalkylene terephthalate is present in an amount of 1 to 5 weight percent.

7. The composition of claim 1, wherein the polyphenylene ether sulfone is present in an amount of 95 to 97 weight percent and the polyalkylene terephthalate is present in an amount of 3 to 5 weight percent.

8. The composition of claim 1, wherein the polymer blend has a single glass transition temperature and no melting temperature as determined by differential scanning calorimetry.

9. The composition of claim 1, wherein the polymer blend has a melt volume rate greater than or equal to 2.5 at 6 minutes when determined according to ASTM D1238-10 at 300° C. and 6.7 kilograms.

10. The composition of claim 1, wherein the polymer blend has a melt volume rate at 18 minutes is within 20% of the melt volume rate at 6 minutes when determined according to ASTM D1238-10 at 337° C. and 6.7 kilograms.

11. The composition of claim 1, wherein the composition has a multi axial total energy greater than or equal to 60 Joules as determined according to ASTM D3763-10.

12. The composition of claim 1, wherein the polyalkylene terephthalate has 0 to 300 ppm of cobalt and 10 to 300 pbw of antimony, titanium or a combination comprising at least one of the foregoing, based on the weight of the polyalkylene terephthalate, and no detectable lead, cadmium or mercury.

13. The composition of claim 1, wherein the polyphenylene ether sulfone has a phenolic hydroxyl end group concentration less than 20 ppm.

14. The composition of claim 1, wherein the composition further comprises titanium dioxide and the composition has a light transmittance less than 60% as determined according to ASTM D1003-03.

\* \* \* \* \*